(12) United States Patent  (10) Patent No.: US 7,698,961 B2
Schostek et al.  (45) Date of Patent: Apr. 20, 2010

(54) TACTILE INSTRUMENT

(75) Inventors: Sebastian Schostek, Tubingen (DE);
Chi-Nghia Ho, Tubingen (DE); Marc Oliver Schurr, Tubingen (DE); Daniel Kalanovic, Stuttgart (DE)

(73) Assignee: Novineon Healthcare Technology Partners GmbH, Tubingen (DE)

( * ) Notice: Subject to any disclaimer, the term of this patent is extended or adjusted under 35 U.S.C. 154(b) by 0 days.

(21) Appl. No.: 11/142,633

(22) Filed: May 31, 2005

(65) Prior Publication Data
US 2005/0262949 A1 Dec. 1, 2005

(30) Foreign Application Priority Data
May 31, 2004 (DE) ........................ 10 2004 026 307

(51) Int. Cl.
*G01L 1/04* (2006.01)
*G01L 1/00* (2006.01)
(52) U.S. Cl. .................... 73/862.621; 73/862.046; 73/862.625; 73/862.68
(58) Field of Classification Search ............ 73/862.621, 73/862.625–862.628, 862.629, 862.52, 862.53; 324/421, 660, 663, 691; 338/47, 99
See application file for complete search history.

(56) References Cited

U.S. PATENT DOCUMENTS

| | | | | |
|---|---|---|---|---|
| 3,785,381 A | * | 1/1974 | Lower et al. | 606/122 |
| 3,859,485 A | * | 1/1975 | Blinkilde et al. | 200/85 A |
| 4,121,488 A | * | 10/1978 | Akiyama | 84/720 |
| 4,172,216 A | * | 10/1979 | O'Shea | 200/85 R |
| 4,503,705 A | * | 3/1985 | Polchaninoff | 73/172 |
| 4,555,954 A | * | 12/1985 | Kim | 73/862.046 |

(Continued)

FOREIGN PATENT DOCUMENTS

JP 06209900 A * 8/1994

(Continued)

OTHER PUBLICATIONS

Ueda (JP 06209900 A) English Patent Abstract, Published 1994.*

(Continued)

*Primary Examiner*—Lisa M Caputo
*Assistant Examiner*—Punam Patel
(74) *Attorney, Agent, or Firm*—Robert L. Epstein; Epstein Drangel Bazerman & James, LLP

(57) ABSTRACT

The ability of a person to grasp an object and at the same time to feel, as well as to determine mechanical and geometric parameters of the comprehended object, makes him or her irreplaceable for many tasks, i.e. in production or in surgery. The translation of this ability into a technological system has often failed up to now due to lack of special adjusted sensors. The object of this invention is a sensory device, which fulfills the requirements for a tactile sensor system and at the same time affords a cost-effective and simple manufacturing alternative to other sensor principles. The layer structure of the sensor element is so constructed that by effect of an external force of the current by a resistive layer a path is disposed to narrowing or enlargement. The voltage drop over this resistive layer is dependent upon the acting external force and serves as signal sensor.

32 Claims, 15 Drawing Sheets

U.S. PATENT DOCUMENTS

| | | | | |
|---|---|---|---|---|
| 4,634,917 A | * | 1/1987 | Dvorsky et al. | 310/328 |
| 4,661,664 A | * | 4/1987 | Miller | 200/86 R |
| 4,876,419 A | * | 10/1989 | Lodini | 338/114 |
| 4,920,241 A | * | 4/1990 | Miller | 200/86 R |
| 4,964,302 A | * | 10/1990 | Grahn et al. | 73/865.7 |
| 5,014,224 A | * | 5/1991 | Hans | 338/99 |
| 5,060,527 A | * | 10/1991 | Burgess | 73/862.68 |
| 5,163,328 A | * | 11/1992 | Holland et al. | 73/717 |
| 5,209,119 A | * | 5/1993 | Polla et al. | 73/723 |
| 5,209,126 A | * | 5/1993 | Grahn | 73/862.046 |
| 5,526,703 A | * | 6/1996 | Aslam et al. | 73/862.68 |
| 5,693,886 A | * | 12/1997 | Seimiya et al. | 73/718 |
| 5,695,859 A | * | 12/1997 | Burgess | 428/209 |
| 5,760,530 A | * | 6/1998 | Kolesar | 310/339 |
| 5,837,952 A | * | 11/1998 | Oshiro et al. | 200/86 R |
| 5,991,676 A | * | 11/1999 | Podoloff et al. | 701/45 |
| 6,032,542 A | * | 3/2000 | Warnick et al. | 73/862.627 |
| 6,114,645 A | * | 9/2000 | Burgess | 200/512 |
| 6,121,869 A | * | 9/2000 | Burgess | 338/99 |
| 6,165,142 A | * | 12/2000 | Bar | 600/595 |
| 6,452,479 B1 | * | 9/2002 | Sandbach | 338/208 |
| 6,695,808 B2 | * | 2/2004 | Tom | 604/65 |
| 7,080,562 B2 | * | 7/2006 | Knowles et al. | 73/818 |
| 2004/0267121 A1 | * | 12/2004 | Sarvazyan et al. | 600/439 |
| 2006/0016275 A1 | * | 1/2006 | Gravesen et al. | 73/862.042 |

FOREIGN PATENT DOCUMENTS

JP    09084770 A  *  3/1997

OTHER PUBLICATIONS ikeda (JP 09084770 A) English Patent Abstract, Published 1997.*
Patent Abstracts of Japan, JP8117228, Mizuno et al., May 14, 1996.*

* cited by examiner

TACTILE INSTRUMENT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

The present invention relates to a sensor device and more particularly to a device for the measurement and classification of the mechanical and geometric properties of an object through contact.

2. Description of Prior Art Including Information Disclosed Under 37 CFR 1.97 and 1.98

The ability of a person to grasp an object and at the same time to feel, as well as to determine mechanical and geometric parameters, of the grasped object, makes him or her irreplaceable for many tasks, i.e. in production or in surgery. The translation of this ability into a technological system has often failed up to now due to lack of special adjusted sensors. The subject of this invention is a sensory device, which fulfills the requirements for a tactile sensor system and at the same time affords a cost-effective and simple manufacturing alternative to other sensor principles.

BRIEF SUMMARY OF THE INVENTION

The device for the measurement by contact and classification locally of mechanical and geometric properties of an object has at least two sensor elements of this type, which in each case have a first layer, a second layer and a third layer, whereby the first and the third layer exhibit a higher electrical conductivity than the second layer, and whereby also between the first layer and the second layer a direct electrically conducting mechanical connection exists as well as between the second layer and the third layer.

The sensor element of the device is characterized in that at least one of the layers has a different geometric form, such that either between the first conductive layer and the second resistive layer or the second resistive layer and the third conductive layer or also between the first conductive layer and the second resistive layer as well as between the second resistive layer of the third conductive layer an opening is present.

The sensor element is further characterized in that it is of such a form that under force-effect of a force component vertical to the plane of the position of at least one of the layers according to claim 1, the size of the contact surface between the first and the second layer or between the second and the third layer or also between the first and the second as well as between the second and third layer changes.

The sensor element is further characterized in that it has a fourth electrically isolated layer, which stands in mechanical contact with the first conductive layer.

The sensor element is further characterized in that it has a fifth electrically isolated layer, which stands in mechanical contact with the third conductive layer.

The sensor element is further characterized in that the first layer deforms under force effect by a force component vertical to the plane of the position of at least one of the other layers.

The sensor element is further characterized in that it is formed in such a way, that under force-effect of a force component vertical to the plane of the position of at least one of the other layers, the second layer mechanically deforms.

The sensor element is further characterized in that it is formed in such a way, that under force-effect of a force component vertical to the plane of the position of at least one of the other layers, the first and the second layer mechanically deform.

The sensor element is further characterized, in that it is formed in such a way, that under force-effect of a force component vertical to the plane of the position of at least one of the other layers, the first and the third layer mechanically deform.

The sensor element is further characterized in that it is formed in such a way that under force-effect of a force component vertical to the plane of the position of at least one of the other layers, the first, the second, and the third layer mechanically deform.

The sensor element is further characterized in that the conductive layer, as well as the second resistive layer, exhibit no curvature and the third conductive layer exhibits at least one curvature.

The sensor element is further characterized in that the first conductive layer, as well as the third conductive layer, have no curvature and the second resistive layer has at least one curvature.

The sensor element is further characterized in that the first conductive layer has no curvature and at least the second resistive layer as well as the third conductive layer in each case exhibits curvature.

The sensor element is further characterized, in that the first conductive layer at least has a curvature and the second resistive layer as well as the third conductive layer have no curvature.

The sensor element is further characterized in that the first conductive layer as well as the third conductive layer in each case have curvature and the second resistive layer has no curvature.

The sensor element is further characterized in that the first conductive layer and also the second resistive layer at least in any case exhibit curvature and the third conductive layer has no curvature.

The sensor element is further characterized in that the first conductive layer and the second resistive layer and the third conductive layer, in any case, exhibit a curvature.

The sensor element is further characterized in that it has at least one electrically isolated layer, which is between the fourth electrically isolated layer and the fifth electrically isolated layer.

The sensor element is further characterized in that the sixth electrically isolated layer exhibits breakthroughs within the area of the sensor element.

The sensor element is further characterized in that the sixth electrically isolated layer is situated between the fourth electrically isolated layer and the second resistive layer and stands in direct mechanical contact with those layers.

The sensor element is further characterized in that the sixth electrically isolated layer is situated between the fourth electrically isolated layer and the third resistive layer and stands in direct mechanical contact with those layers.

The sensor element is further characterized in that the sixth electrically isolated layer is situated between the fifth electrically isolated layer and the first conductive layer and stands in direct mechanical contact with those layers.

The sensor element is further characterized in that the sixth electrically isolated layer is situated between the fifth electrically isolated layer and the second resistive layer and stands in direct mechanical contact with those layers.

The sensor element is further characterized in that the sixth electrically isolated layer is situated between the first conductive layer and the second resistive layer and stands in direct mechanical contact with those layers.

The sensor element is further characterized in that the fourth electrically isolated layer possesses a first geometric structure.

The sensor element is further characterized in that the first geometric structure exhibits a direct mechanical contact with the second resistive layer.

The sensor element is further characterized in that the first geometric has a direct mechanical contact with the third conductive layer.

The sensor element is further characterized in that the fifth electrically isolated layer has a second geometric structure.

The sensor element is further characterized in that the second geometric structure has a direct mechanical contact with the first conductive layer.

The sensor element is further characterized in that the second geometric structure is in direct mechanical contact with the second resistive layer.

The device for the measurement by contact and classification locally of mechanical and geometric properties of an object is further characterized in that all sensor elements possess the geometric form selected from one of the following group: circular, elliptical, three-cornered, quadratic, right-cornered, six-cornered, eight-cornered, rhombic and irregular.

The device is further characterized in that all sensor elements possess the same size.

The device is further characterized, in that at least two of the sensor elements exhibit a different size.

The device is further characterized in that at least two of the sensor elements have a different geometric form.

The device is characterized that the sensor elements are arranged according to an arrangement selected from the following group: axial-symmetrically arranged, arranged in at least one row, arranged orthogonally, hexagonally arranged, concentrically arranged, arranged in spiral-form, point-symmetrically arranged.

The device is further characterized in that the sensor elements are arranged irregularly.

The device is further characterized in that between the first conductive layer of a sensor element and the first conductive layer another sensor element no direct electrically conductive connection exists.

The device is further characterized in that between the third layer of a sensor element and the third layer of another sensor element no direct electrically connection exists.

The device is further characterized in that between the third layer of a sensor element and the third layer of at least one other sensor element, direct electrically conductive connection exists.

The device is further characterized in that the between the third layer of a sensor element and the third layer of all other sensor elements, direct electrically conductive connection exists.

The device is further characterized that between the third layer of a sensor element and the third layer of another sensor element, no direct electrically conductive connection exists.

The device is further characterized that between the first layer of a sensor element and the first layer of at least one other sensor element, a direct electrically conductive connection exists.

The device is further characterized in that between the first layer of a sensor element and the first layer of all other sensor elements, a direct electrically conducting connection exists.

The device is further characterized in that the first layers of sensor elements according divides into least two groups, wherein the first layers of the sensor elements within a group have a direct electrically conductive connection with one another.

The device is further characterized in that the third layer of the sensor elements are at least divided into two groups whereby the third layers of the sensor element within a group has a direct electrically conductive connection with one another.

The device is further characterized in that the second layer of a sensor element and the second layer of another sensor element, no direct electrically conducting connection exist.

The device is further characterized in that it is a sensor element and is a probe.

The device is further characterized in that it is a sensor element and is a tongs.

The sensor element that forms a part of the device is further characterized in that it is a surgical instrument.

The sensor element is further characterized in that the fourth electrically isolated layer is flexible and that the fifth electrically isolated layer is rigid.

The sensor is further characterized in that the fourth electrically isolated layer as well as the fifth electrically isolated layer is flexible.

The sensor element is further characterized in that the first conductive layer has at least one electrically conducting supply lead.

The sensor element is further characterized in that the electrically conducting supply lead guides through the volume of the fourth electrically isolated layer.

The sensor element is further characterized in that the third electrically conducting supply lead.

The sensor element is further characterized in that the electrical supply lead guides through the volume of the fifth electrically isolated layer.

BRIEF DESCRIPTION OF THE SEVERAL VIEWS OF DRAWINGS

To these and to such other objects that may hereinafter appears, the present invention relates to a tactile instrument as described in detail in the following specification and recited in the annexed claims, taken together with the accompanying drawings, in which like numerals refer to like parts and in which:

DETAILED DESCRIPTION OF THE INVENTION

Figure 1:
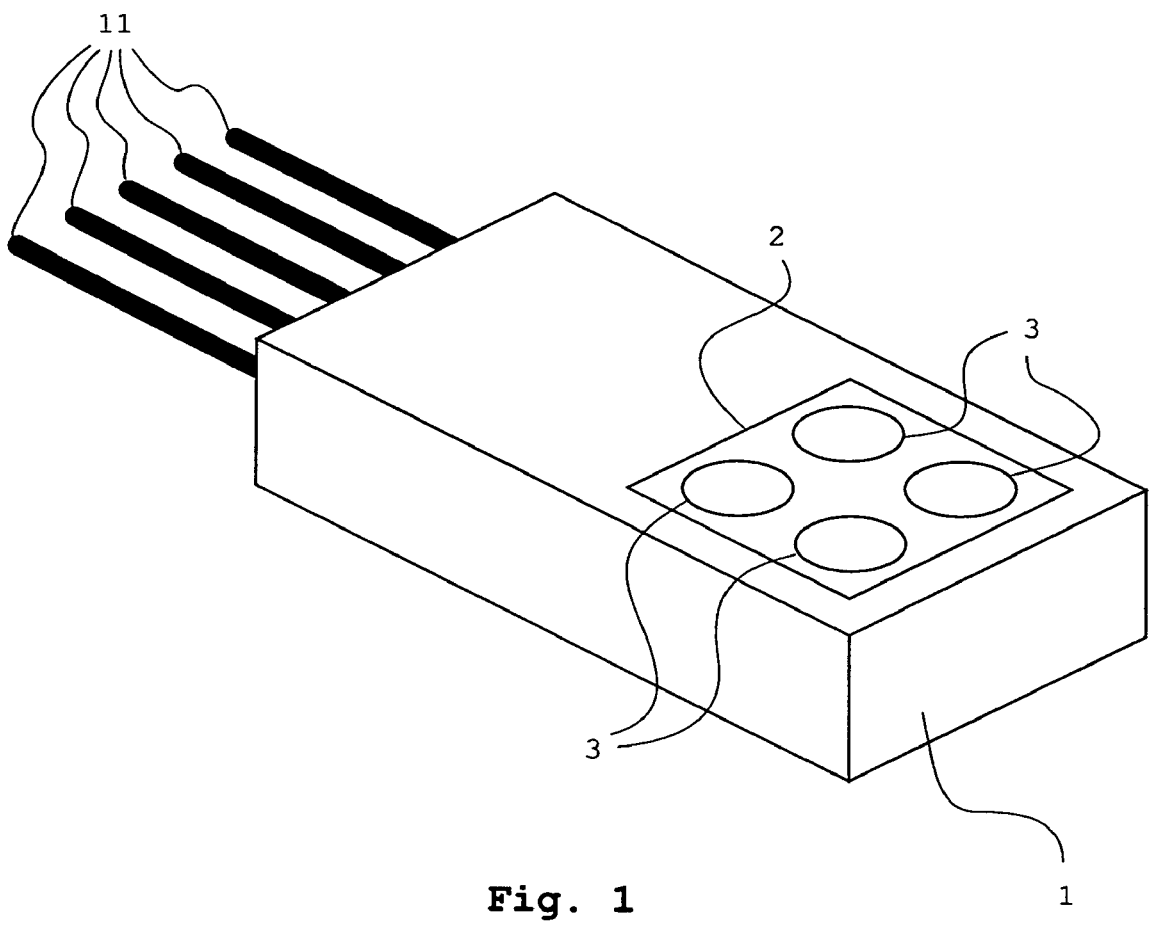
FIG. 1 is an isometric view of the exterior of the device of the present invention.

The device (1), the object of this invention, consists of a sensor-surface (2), in which many individual sensor elements (3) are integrated (see FIG. 1).

Each of these sensor elements (3) consists of at least three layers with different electrical properties. The first conductive layer (5) and the third conductive layer (9) possess in comparison to the second resistive layer (6) a clearly smaller ohmic resistance. The first conductive layer (5) and the third conductive layer (9) stand in direct mechanical contact with the second resistive layer (6). In contrast, the first conductive layer (5) and the third conductive layer (9) have no direct mechanical contact with one another. With conductive layer (5) and the third conductive layer (9) the electric current must immediately flow through the second resistive layer (6). Between the first conductive layer (5) and the second resistive layer (6) or between the second resistive layer (6) and the third conductive layer (9) or also between the first conductive layer (5) and the second resistive layer (6) as well as between the second resistive layer (6) and the third conductive layer (9) there is at least one opening (7).

With external force effect on the sensor surface (2) by a force component vertical to the surface of the position of at least one of the layers (5), (6) or (9) the size is changed of the contact surface between the first conductive layer (5) and the second resistive layer (6) or between the second resistive layer (6) and the third conductive layer (9) or also between the first conductive layer (5) and the second resistive layer (6) as well as between the second resistive layer (6) and the third conductive layer (9). Through the alteration of the size of the contact surface at the same time the size of the pathway is changed, which stands disposed to an electric current flow between the first conductive layer (5) and the third conductive layer (9) through the second resistive layer (6). With applied constant potential difference between the first conductive layer (5) and the third conductive layer (9) a direct alteration of the current flow is indicated according to the following formula:

$$I = \frac{U}{\rho \cdot d} \cdot A$$

Here, I is the current, U is the applied electric potential difference between the first conductive layer (5) and the third conductive layer (9), $\rho$ is the specific electric resistance of the material of the second resistive layer (6), d is the thickness of the second resistive layer (6) and A is the area upwardly from contact surfaces between the first conductive layer (5) and the second resistive layer (6) as well as between the second resistive layer (6) and the third conductive layer (9) at the disposal of the resulting current. This alteration of the current flow is used for measurement of the applied external force.

In a further improvement the first conductive layer (5) is a sensor element (3) upwardly through a fourth electrically active layer (4) electrically isolated. This fourth electrically isolated layer (4) serves for this purpose, to take up the external force and conduct it to the additional layer structure. The layers (5), (6) and (9) should therefore be protected against mechanical damage from the object. This fourth electrically isolated layer (4) consists, for example, of an elastomer, which conducts the external acting force to the sensor elements (3) lying thereunder.

In another advantageous development the third conductive layer (6) is sensor element (3) electrically isolated upwardly by a fifth electrically isolated layer (8). This fifth electrically isolated layer (8) consists, for example, of a mechanically strong material and gives the sensor element (3) a certain mechanical stability. It can consist, for example, of a ceramic material or laminated fiber-material.

In a further advantageous development the alteration of the contact surface is obtained by means of a deformation of at least one of the layers (5), (6) or (9). With external force effect upon the sensor surface (2) by a forced component vertical to the plane of the position of at least one of the layers (5), (6) or (9) at least one of the layers (5), (6) or (9) deforms in such a way that it presses itself closely to the adjacent layer in each case and thereby the contact surface enlarges.

Figure 2:
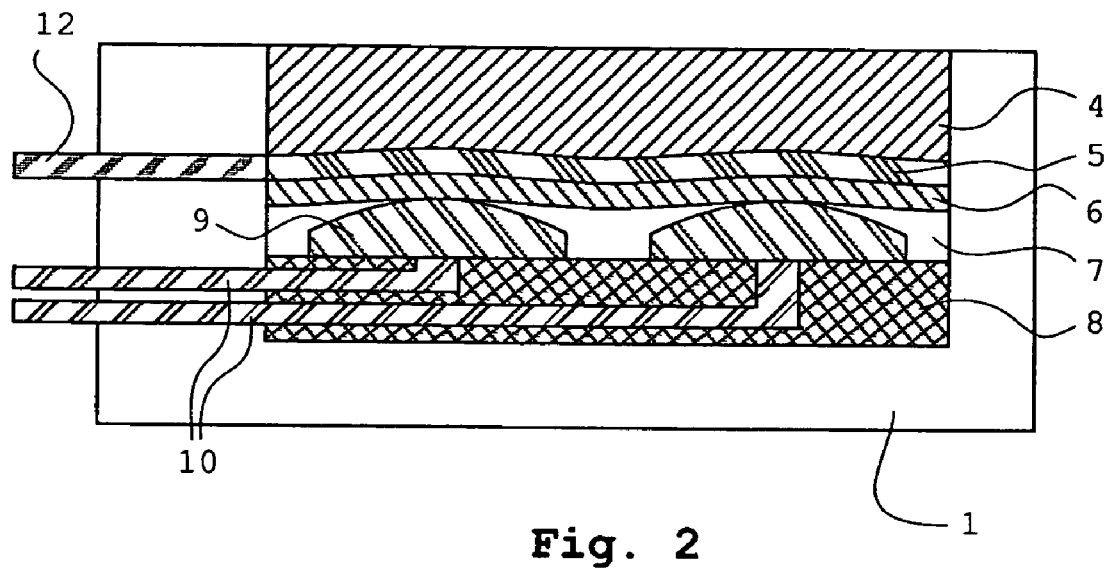
FIG. 2 is a cross-sectional view of the first preferred embodiment of the present invention.
Figure 4:
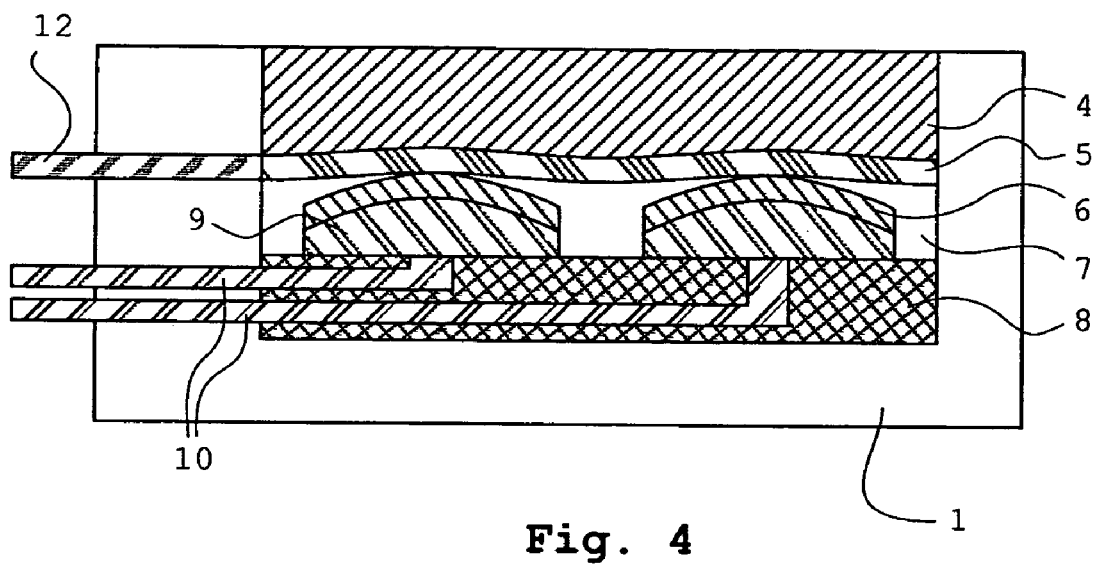
FIG. 4 is a cross-sectional view of a third preferred embodiment of the present invention.

In a further advantageous development at least one of the layers (5), (6), and (9) displays a different geometric form of a type such that either between the first conductive layer (5) and the second resistive layer (6) or between the second resistive layer (6) and the third conductive layer (9) or between the first conductive layer (5) and the second resistive layer (6) as well as between the second resistive layer (6) and the third conductive layer (9) at least one opening (7) can develop. Preferably, the third conductive layer (9) has a convex curvature. The second resistive layer (6) is thereby either with the first conductive layer (5) tightly bonded, see FIG. 2, or tightly bonded with the third conductive layer (9), see FIG. 4.

In a further advantageous development a sixth electrically isolated layer (13) stations itself between the forth electrically isolated layer (4) and the fifth electrically isolated (8). This sixth electrically isolated layer (13) exhibits breakthroughs, so that it can form openings between layers (5), (6) and (9). The sixth electrically isolated layer (13) produces in the layer construction of the sensor element (3) a structure, which can favor the deformation of the individual layers (5), (6) and (9).

Figure 13:
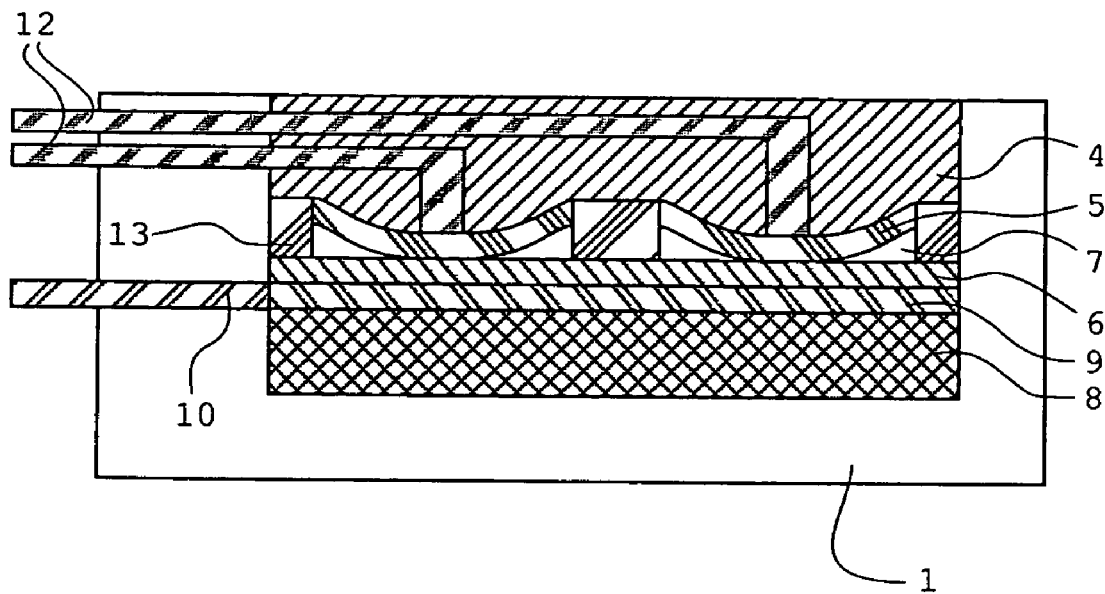
FIG. 13 is a cross-sectional view of a twelfth preferred embodiment of the present invention.

In another advantageous development, the sixth electrically isolated layer (13) is between the fourth isolated layer (4) and the second resistive layer (6), see FIG. 13. The first conductive layer (5) of a sensor element (3) is thereby electrically isolated from the first conductive layer (5) of an adjacent sensor element (3), while the third conductive layer (9) of a sensor element (3) stands in direct electrically contact with the third conductive layer (9) of an adjacent sensor element (3). The second resistive layer (6) of a sensor element (3) spreads over the adjacent sensor element (3). For the manufacture of a mechanically and electrically conducting contact between the first conductive layer (5) and the second resistive layer (6), the deformation of the first conductive layer (5) is necessarily preferred.

Figure 9:
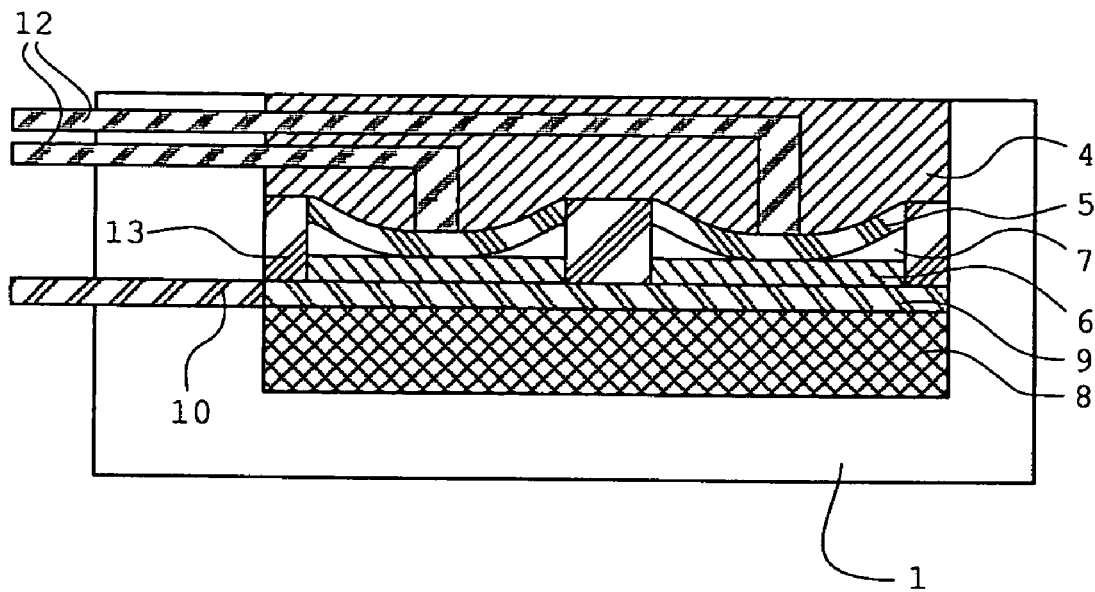
FIG. 9 is a cross-sectional view of a eighth preferred embodiment of the present invention.
Figure 10:
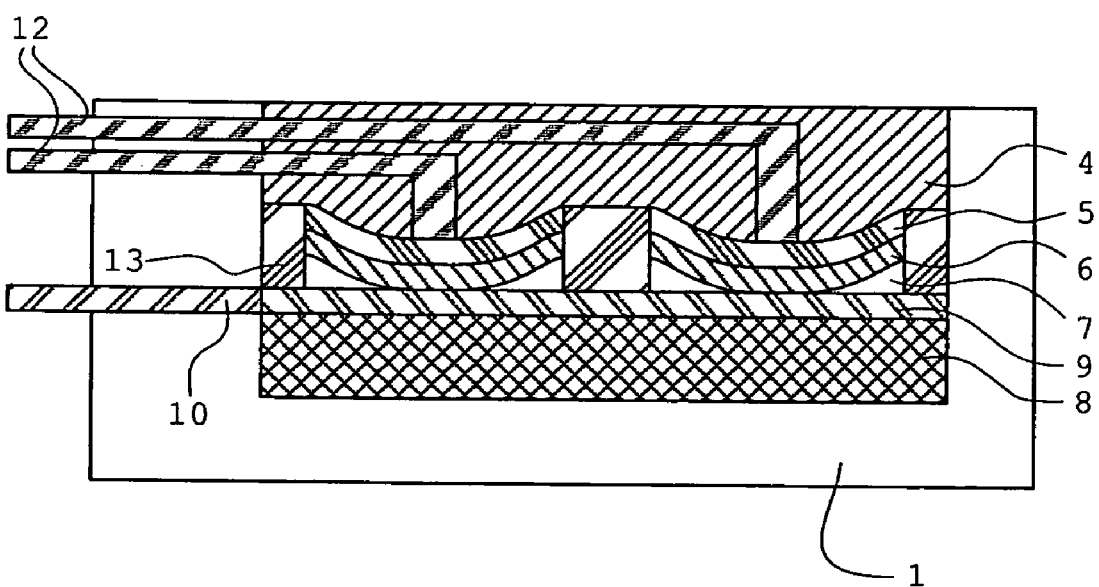
FIG. 10 is a cross-sectional view of a ninth preferred embodiment of the present invention.

In another advantageous development, the sixth electrically isolated layer (13) is between the fourth electrically isolated layer (4) and the third conductive layer (9), see FIGS. 9 and 10. The first conductive layer (5) of a sensor element (3) is thereby electrically isolated from the first conductive layer (5) of an adjacent sensory element (3), while the third conductive layer (9) of a sensor element (3) stands in direct electrically conducting contact with the third conductive layer (9) of an adjacent sensor element (3). The second resistive layer (6) of a sensor element (3) is thereby electrically isolated from the second resistive layer (6) of an adjacent sensor element (3). The second resistive layer (6) can optionally be tightly joined with the first conduct layer (5) or with the third conductive layer (9). Correspondingly, the opening (7) is localized between either the first conductive layer (5) and the second resistive layer (6) or between the second resistive layer (6) and the third conductive layer (9).

Figure 6:
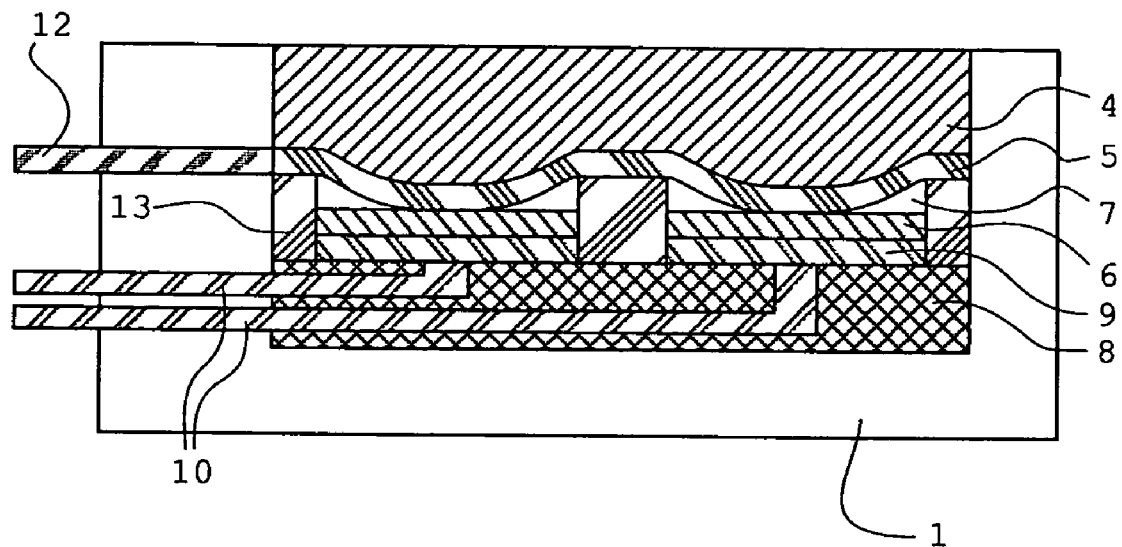
FIG. 6 is a cross-sectional view of a fifth preferred embodiment of the present invention.
Figure 14:
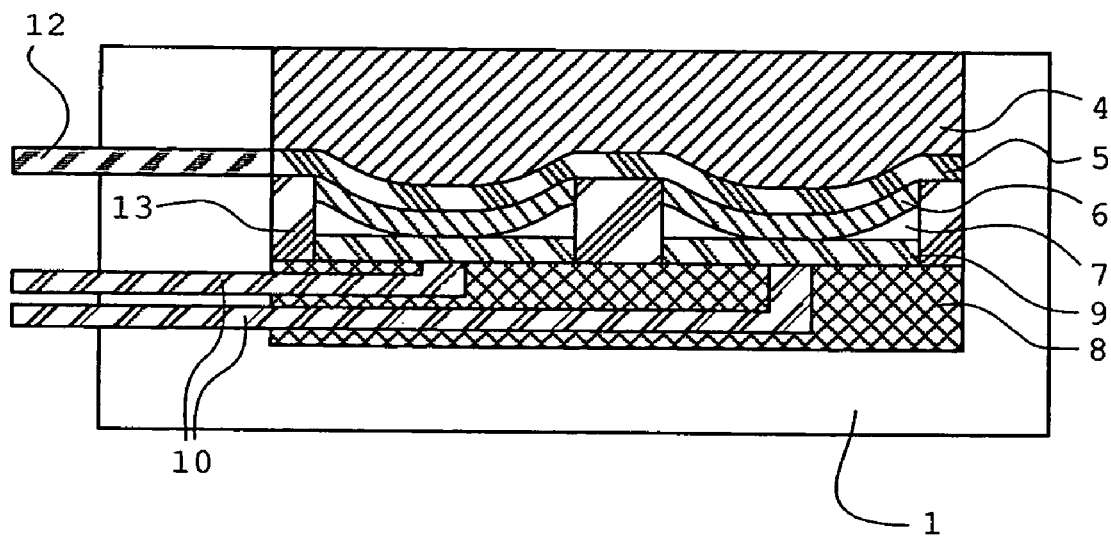
FIG. 14 is a cross-sectional view of a thirteenth preferred embodiment of the present invention.

In another advantageous development, the sixth electrically isolated layer (13) is between the first conductive layer (5) and the fifth electrically isolated layer (8), see FIGS. 6 and 14. The first conductive layer (5) of an adjacent sensor element (3) thereby stands in direct electrically conducting contact with the first conductive layer (5) of an adjacent sensor element (3), while the third conductive layer (9) of a sensor element (3) is electrically isolated from the third conductive layer (9) of an adjacent sensor element (3). The second resistive layer (6) of a sensor element (3) is thereby electrically isolated from the second resistive layer (6) of an adjacent sensor element (3). The second resistive layer (6) can optionally be tightly joined with the first conductive layer (5) or be tightly joined to the third conductive layer (9). Correspondingly, the opening (7) is localized either between the first conductive layer (5) and the second resistive layer (6) or between the second resistive layer (6) and the third conductive layer (9).

Figure 7:
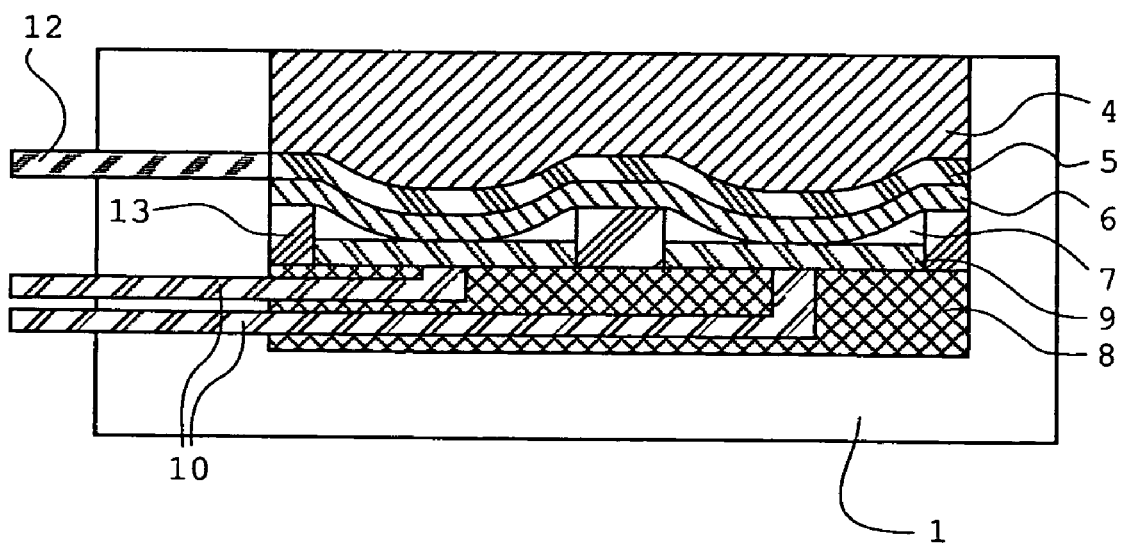
FIG. 7 is a cross-sectional view of a sixth preferred embodiment of the present invention.

In a further advantageous development, the sixth electrically isolated layer (13) is between the second resistive layer (6) and the fifth electrically layer (8), see FIG. 7. The first conductive layer (5) of a sensor element (3) stands in direct electrically conducting contact with the first conductive layer (5) of an adjacent sensor element (3), while the third conductive layer (9) of a sensor element (3) is electrically isolated from the third conductive layer (9) of an adjacent sensor element (3). The second resistive sheet (6) of a sensor element (3) spreads over the adjacent sensor element (3). For the manufacture of a mechanically and electrically conducting contact between the first conductive layer (5) and the second resistive layer (6) the deformation of the first conductive layer (5) and also the second resistive layer (6) is necessarily preferred.

Figure 8:
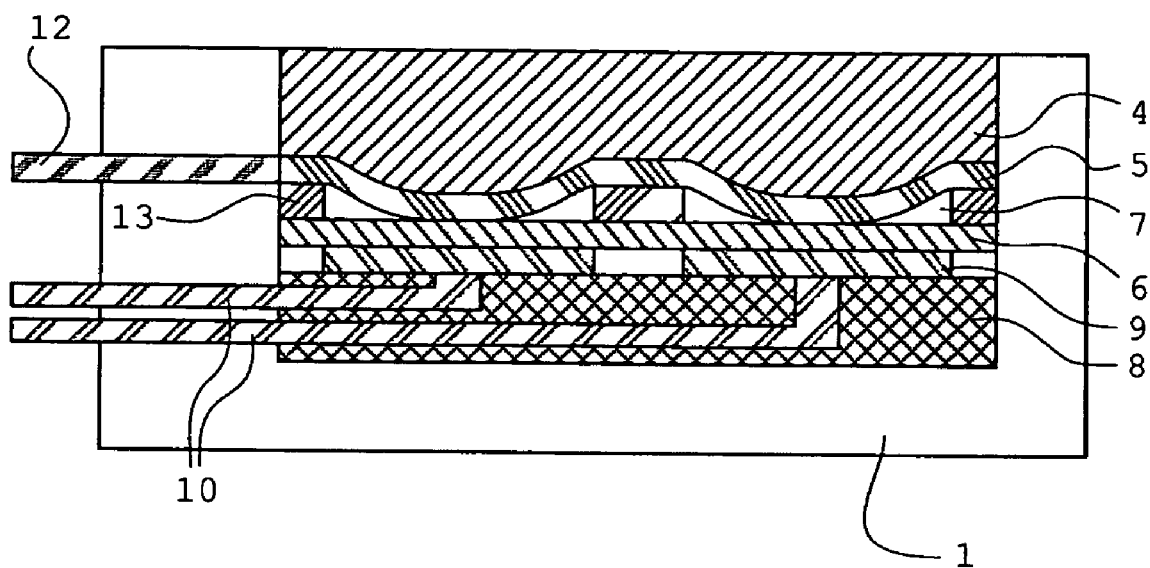
FIG. 8 is a cross-sectional view of a seventh preferred embodiment of the present invention.

In another advantageous development, the sixth electrically isolated layer (13) is situated between the first conductive layer (5) and the second resistive layer (6), see FIG. 8. The first conductive layer (5) of a sensor element (3) thereby stands in direct electrically conducting contact with the first conductive layer (5) of an adjacent sensor element (3), while the third conductive layer (9) of a sensor element (3) is electrically isolated from the third conductive layer (9) of an adjacent sensor element (3). The second resistive layer (6) of a sensor element (3) spreads over the adjacent sensor element (3). For the manufacture of a mechanically and electrically conducting contact between the first conductive layer (5) and the second resistive layer (6) the deformation of the first conductive layer (5) is necessarily preferred.

Figure 11:
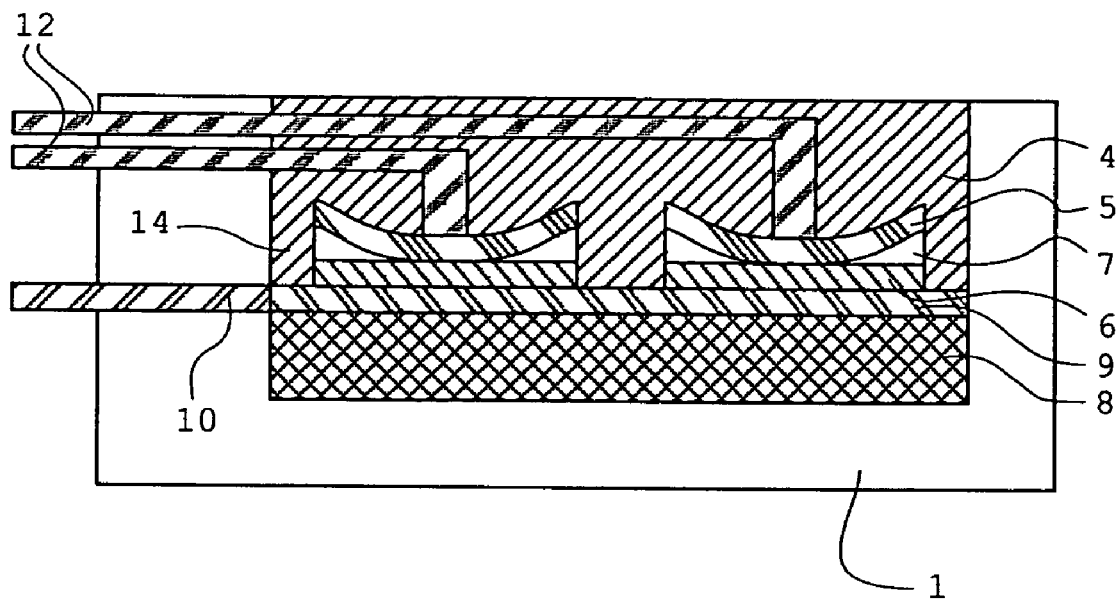
FIG. 11 is a cross-sectional view of a tenth preferred embodiment of the present invention.
Figure 12:
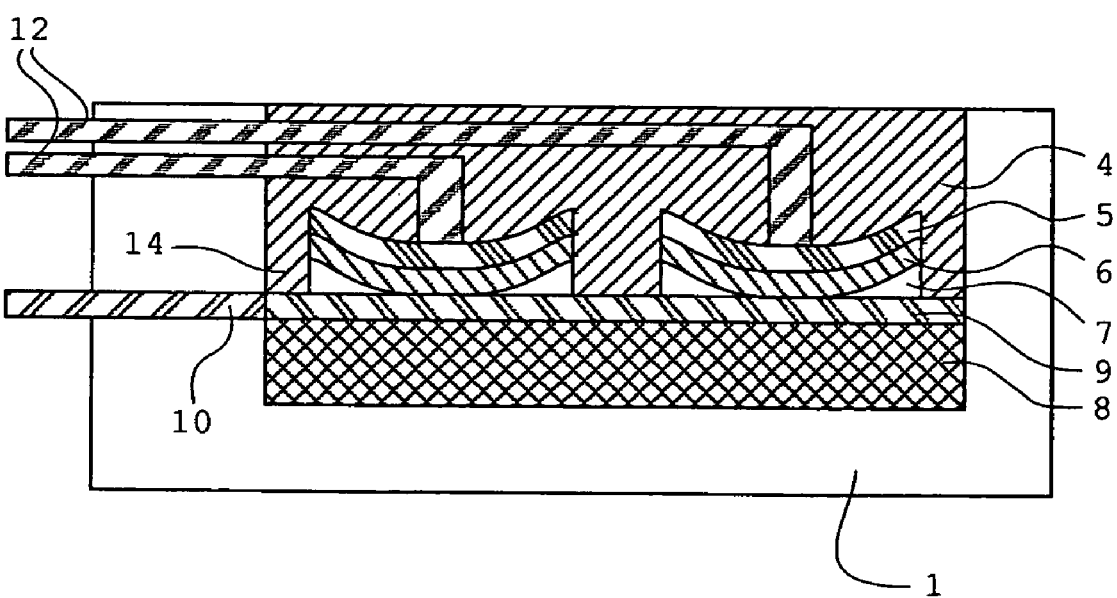
FIG. 12 is a cross-sectional view of a eleventh preferred embodiment of the present invention.
Figure 15:
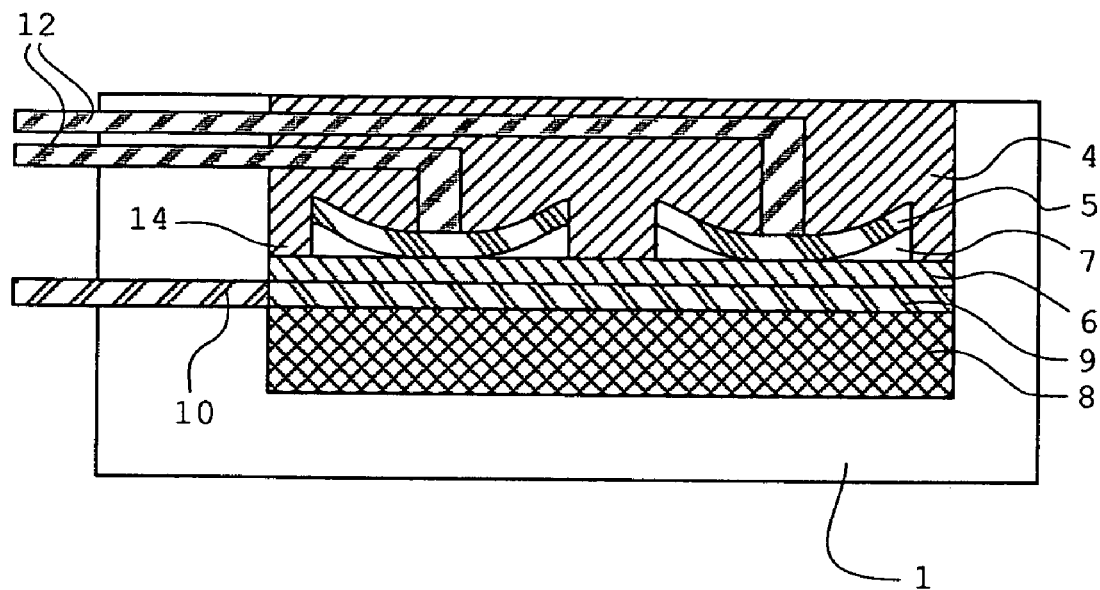
FIG. 15 is a cross-sectional view of a fourteenth preferred embodiment of the present invention.

In another advantageous development the fourth electrically isolated layer (4) displays a first geometric structure (14), which spreads over into the interior of the sensor element (3) and thereby makes possible the formation of an opening (7). This first geometric structure (14) spreads either up to the second resistive layer (6) and stands in direct mechanical contact with it, see FIG. 15, or up to the third conductive layer (9) and stands in direct mechanical contact with same, see FIGS. 11 and 12.

Figure 3:
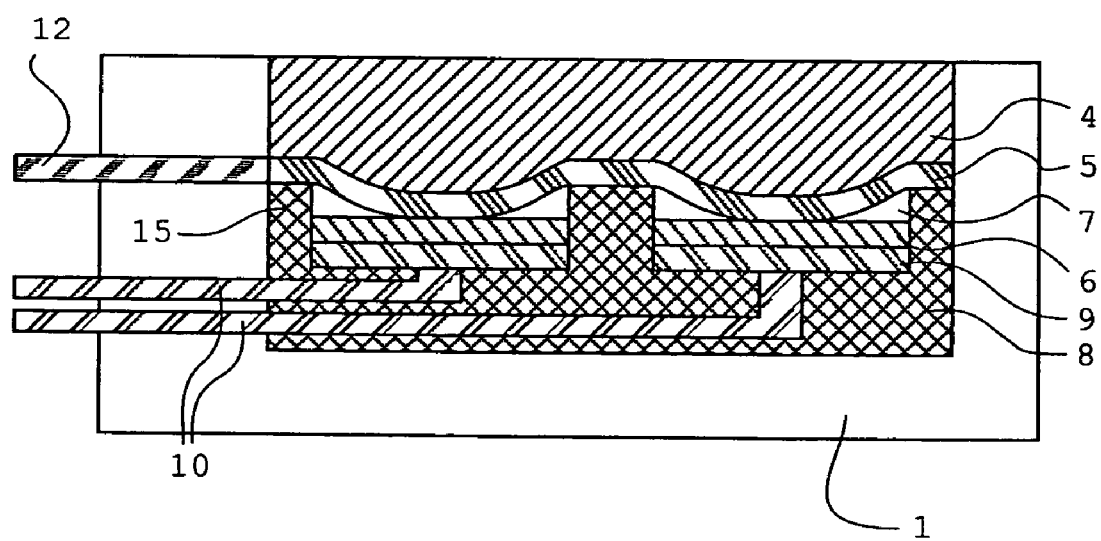
FIG. 3 is a cross-sectional view of a second preferred embodiment of the present invention.
Figure 5:
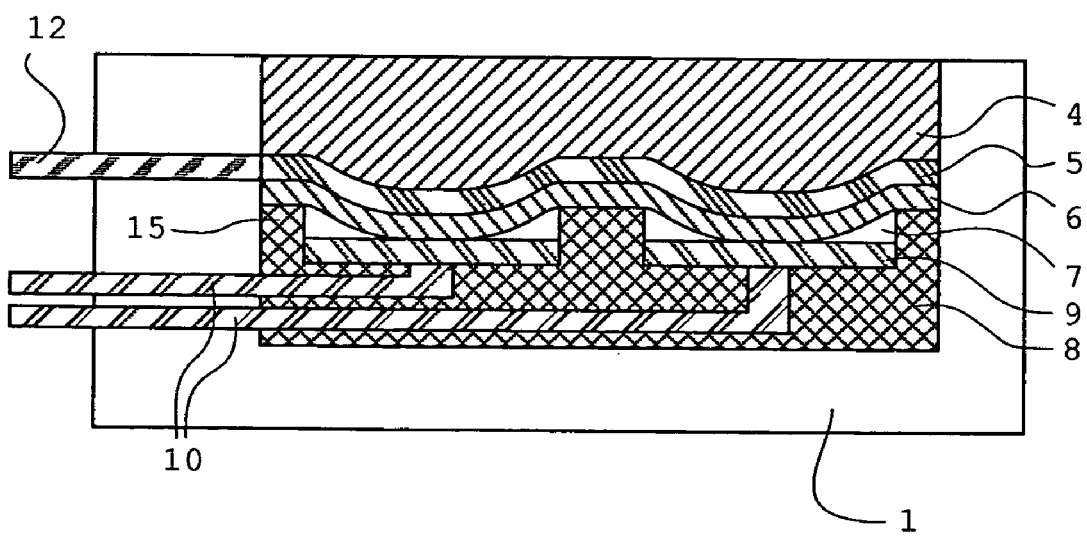
FIG. 5 is a cross-sectional view of a fourth preferred embodiment of the present invention.
Figure 16:
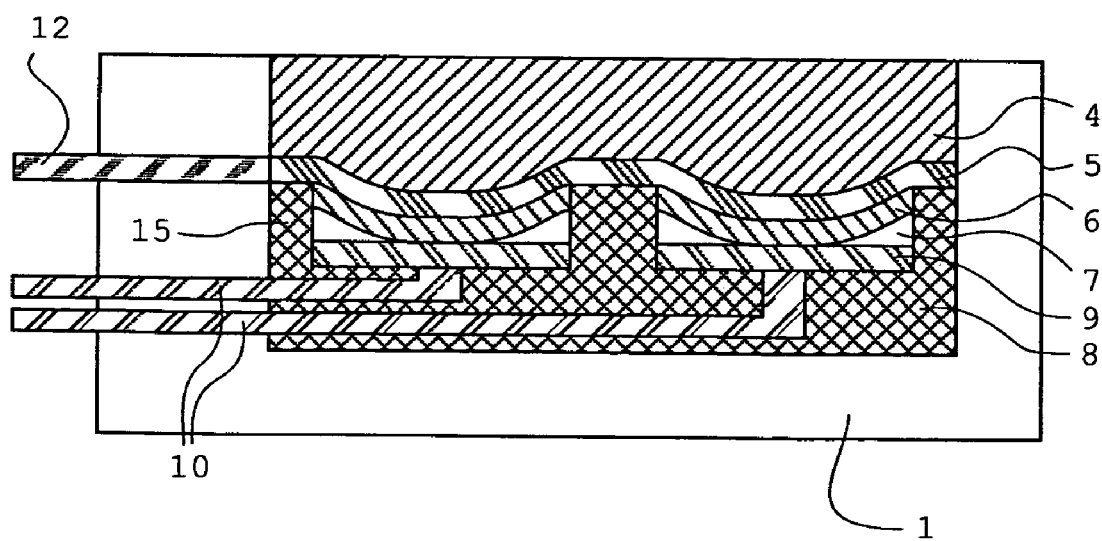
FIG. 16 is a cross-sectional view of a fifteenth preferred embodiment of the present invention.

In a further advantageous development, the fifth electrically isolated layer (8) exhibits a second geometric structure (15), which spreads into the interior of the sensor element (3) and thereby enables the formation of an opening (7). This second geometric structure (15) either spreads up to the first conductive layer (5) and stands in direct mechanical contact with it, see FIGS. 3 and 16, or spreads up to the second resistive layer (6) and is in direct mechanical contact with same, see FIG. 5.

Figure 17:
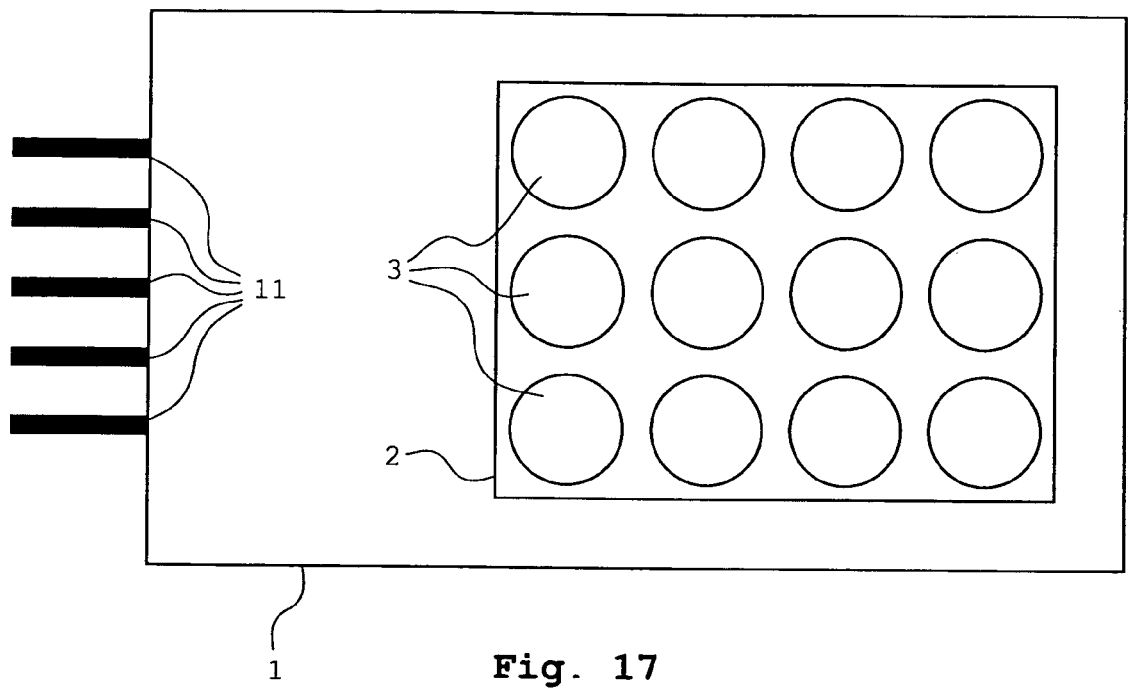
FIG. 17 is an elevation view of the device of the present invention with circular sensor elements in orthogonal arrangement.

In a further advantageous development, the sensor element (3) has a circular form see FIG. 17.

Figure 18:
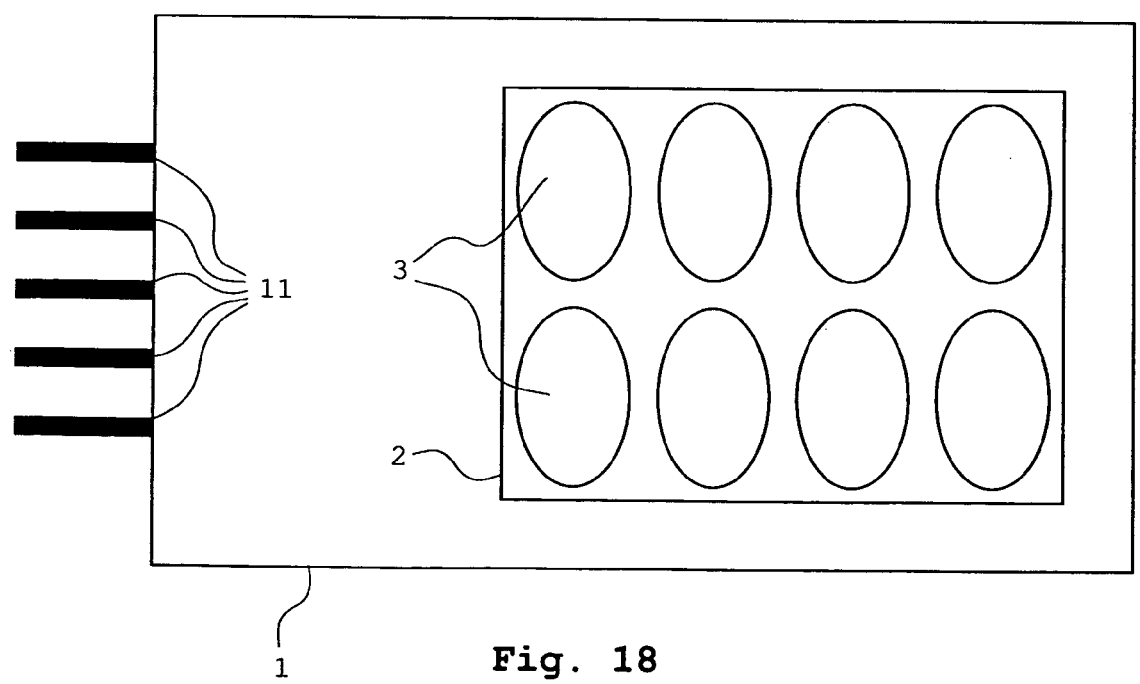
FIG. 18 is an elevation view of the device of the present invention with elliptical sensor elements in orthogonal arrangement.

In a further advantageous development, the sensor element (3) has an elliptical form see FIG. 18.

Figure 19:
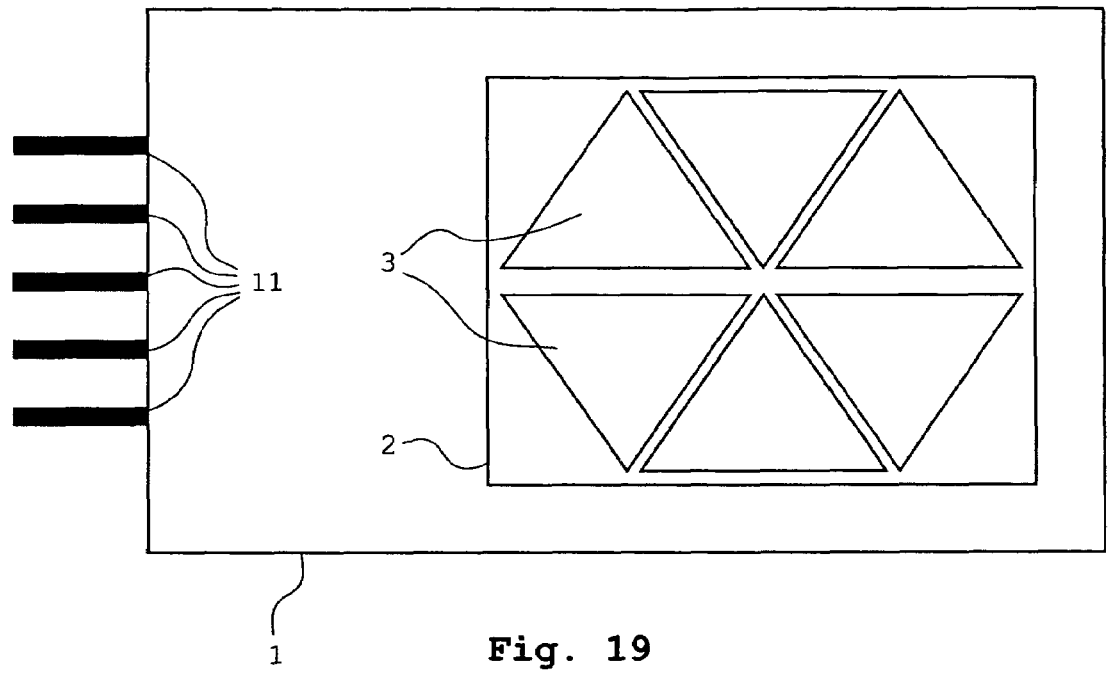
FIG. 19 is an elevation view of the device of the present invention with three-cornered sensor elements arranged in at least one row.

In a further advantageous development, the sensor element (3) has a three-cornered form, see FIG. 19.

Figure 20:
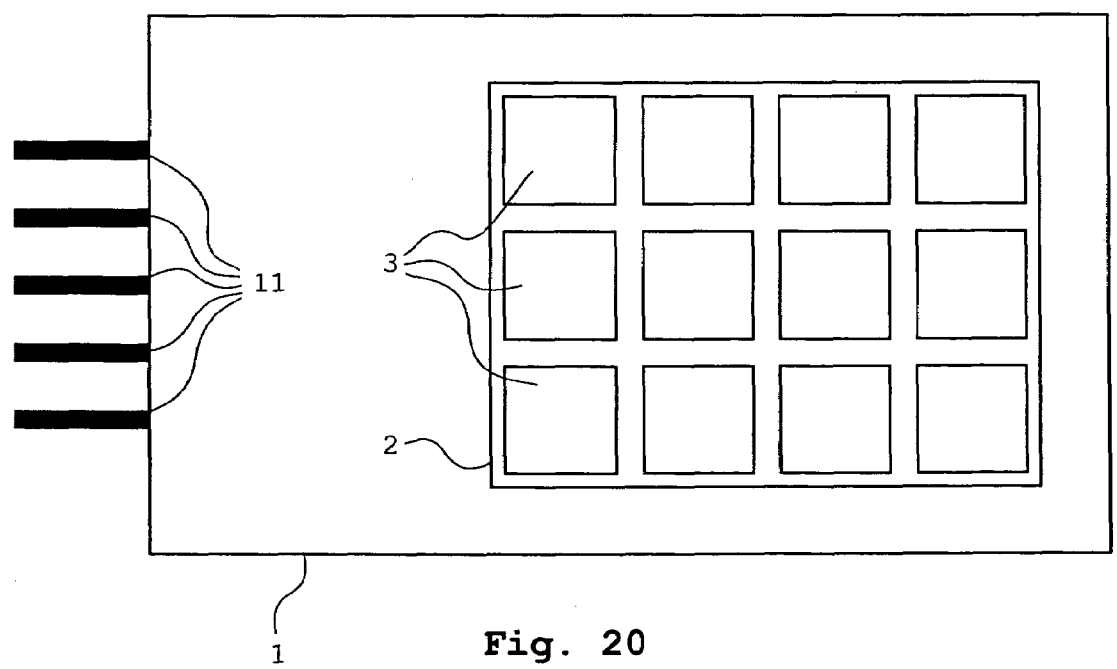
FIG. 20 is an elevation view of the device of the present invention with quadratic sensor elements in orthogonal arrangement.

In a further advantageous development, the sensor element (3) has a quadratic form, see FIG. 20.

Figure 21:
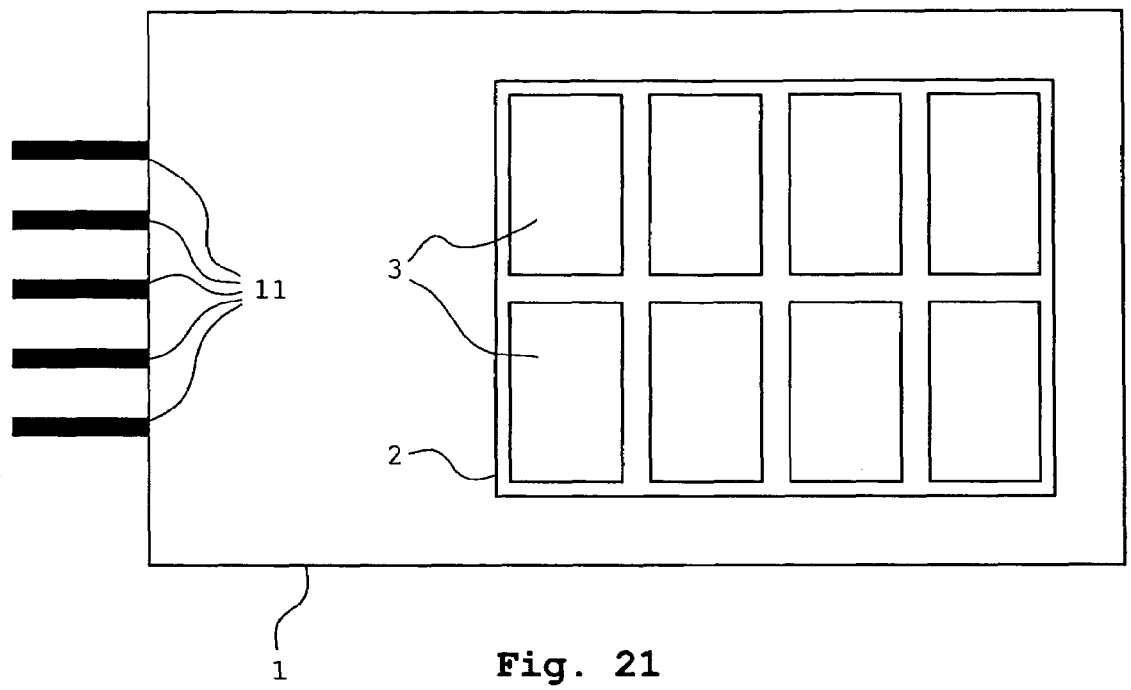
FIG. 21 is an elevation view of the device of the present invention with right-cornered sensor elements in orthogonal arrangement.

In a further advantageous development, the sensor element (3) has a right-cornered form, see FIG. 21.

Figure 22:
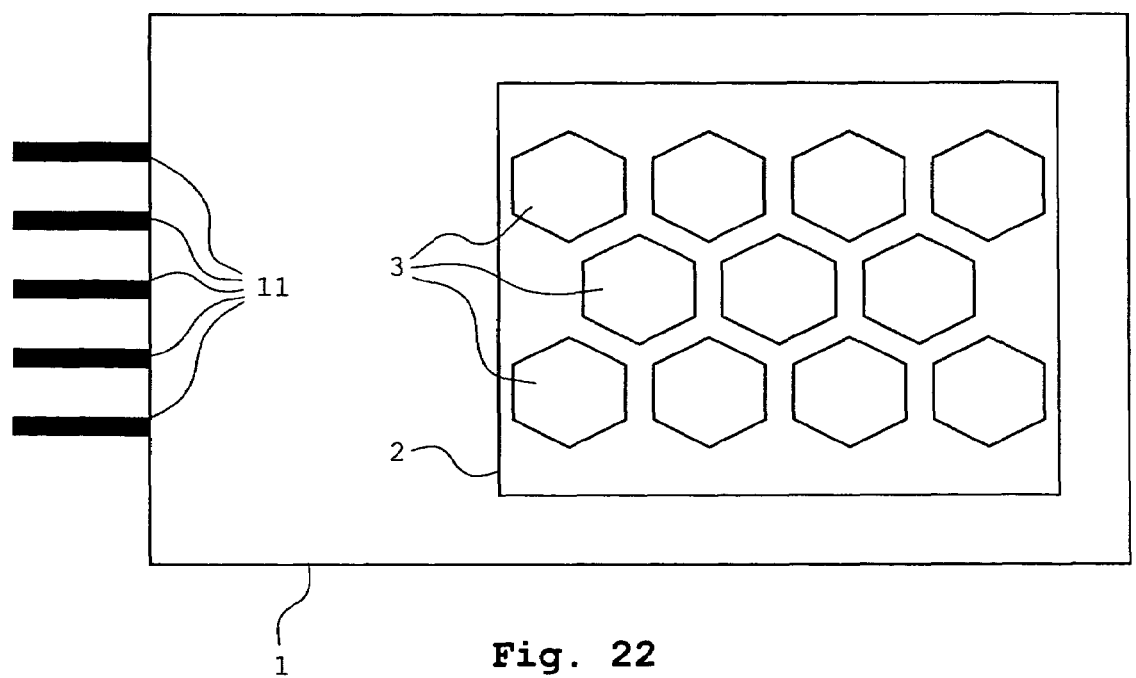
FIG. 22 is an elevation view of the device of the present invention with six cornered sensor elements in hexagonal arrangement.

In a further advantageous development, the sensor element (3) has a six-cornered form, see FIG. 22.

Figure 23:
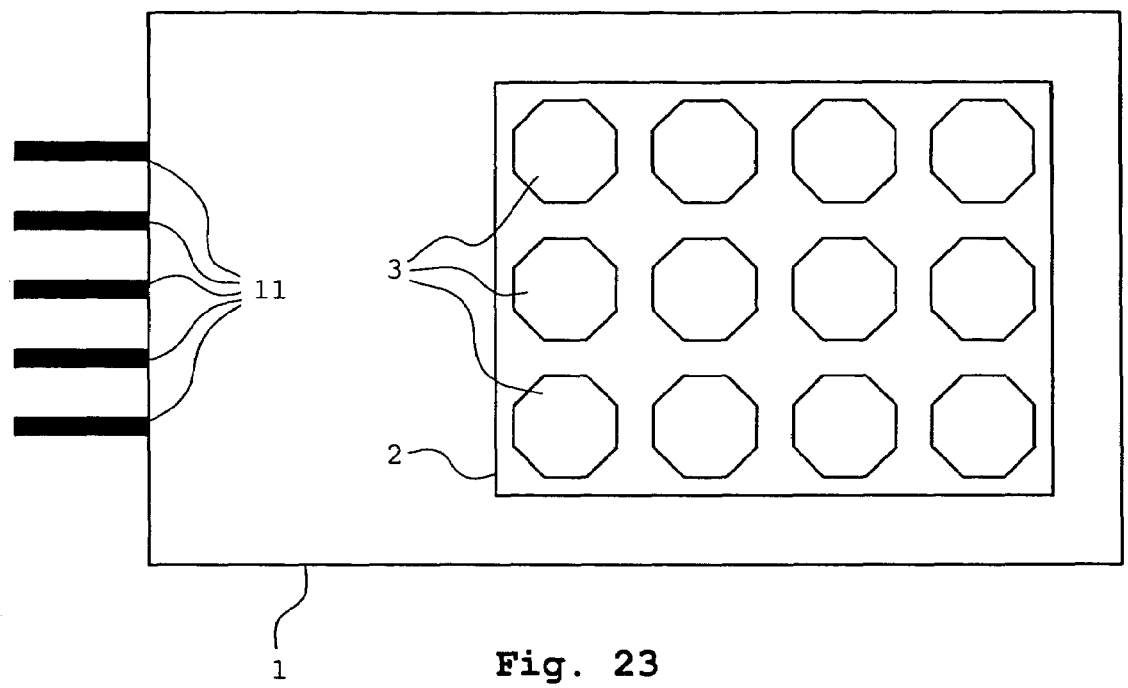
FIG. 23 is an elevation view of the device of the present invention with eight-cornered sensor elements in orthogonal arrangement.

In a further advantageous development, the sensor element (3) has an eight-cornered form, see FIG. 23.

Figure 24:
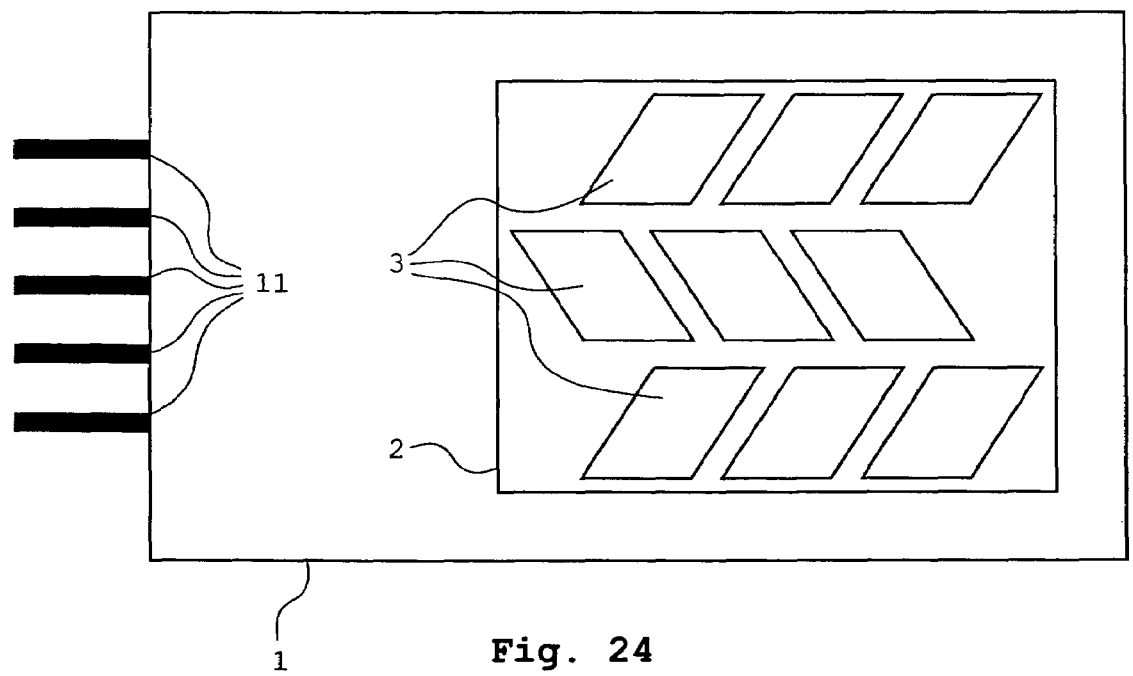
FIG. 24 is an elevation view of the device of the present invention with rhombic sensor elements arranged in at least one row.

In a further advantageous development, the sensor element (3) has a rhombic form, see FIG. 24.

Figure 25:
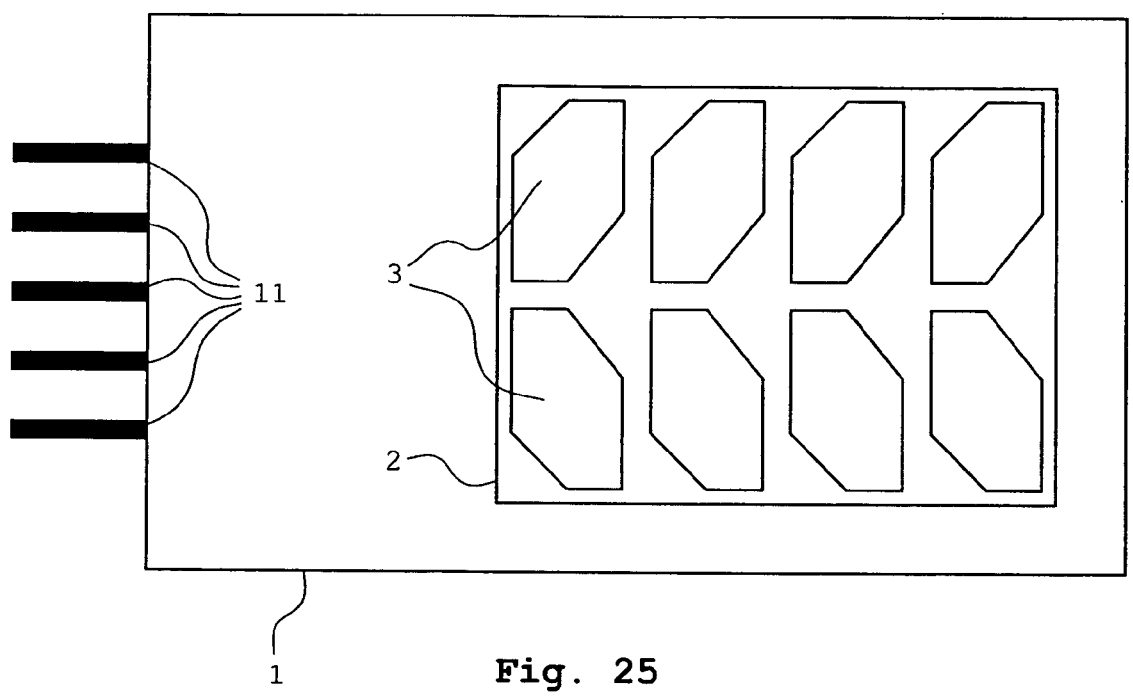
FIG. 25 is an elevation view of the device of the present invention with irregularly formed sensor elements arranged in at least one row.

In a further advantageous development, the sensor element (3) has an irregular form, see FIG. 25.

In a further advantageous development, all sensor elements (3) of the device (1) have the same geometric form, see FIG. 17.

In a further advantageous development, all sensor elements (3) of the device (1) have the same size, see FIG. 17.

Figure 26:
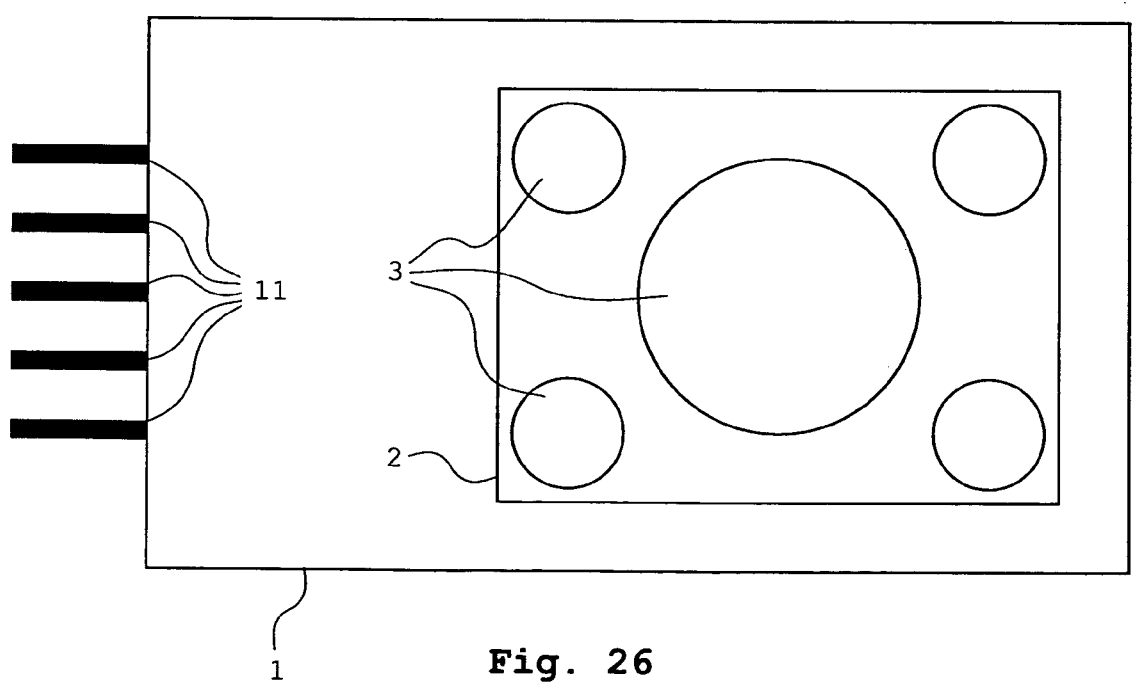
FIG. 26 is an elevation view of the device of the present invention with circular sensor elements of different sizes in concentric arrangement.

In a further advantageous development, at least two sensor elements (3) of the device (1) have a different size, see FIG. 26.

In a further advantageous development, at least two sensor elements (3) of the device (1) have a different geometric form, see FIG. 25.

In a further advantageous development, the sensor elements (3) of the device (1) are arranged in at least one row, see FIG. 24.

In a further advantageous development, the sensor element (3) of the device (1) is arranged orthogonally, see FIG. 17.

In a further advantageous development, the sensor element (3) of the device (1) is arranged hexagonally, see FIG. 22.

In a further advantageous development, the sensor element (3) of the device (1) is concentrically arranged, see FIG. 26.

Figure 27:
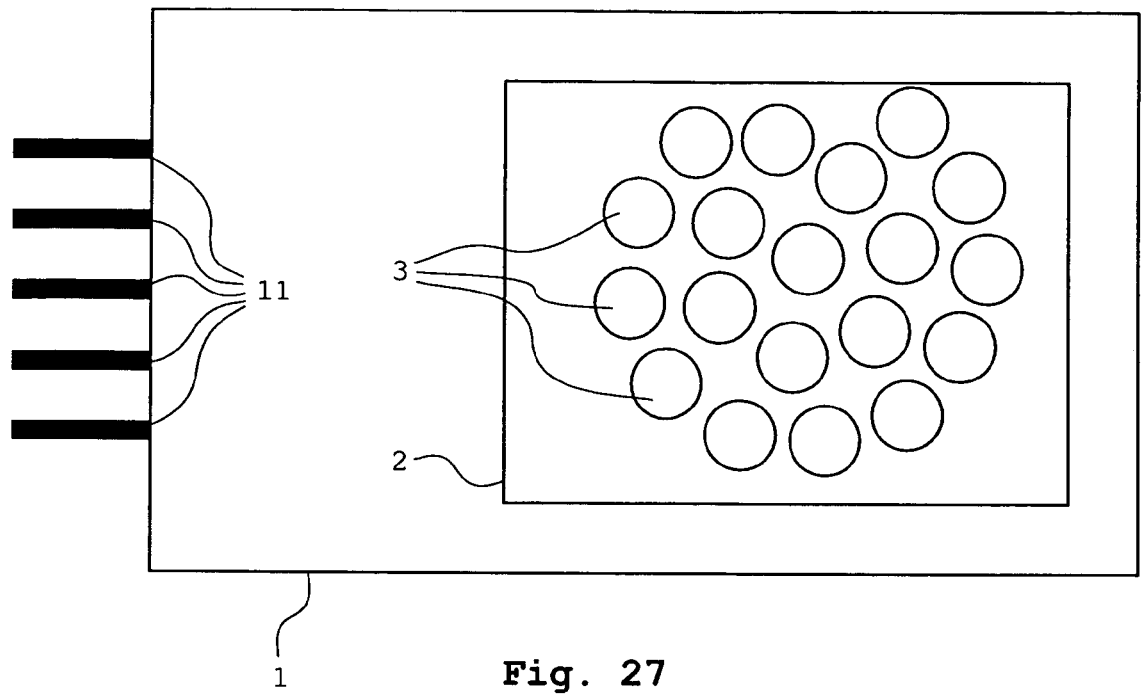
FIG. 27 is an elevation view of the device of the present invention with circular sensor elements in spiral-formed arrangement.

In a further advantageous development, the sensor element (3) of the device (1) is arranged in a spiral form, see FIG. 27.

In a further advantageous development, the sensor element (3) of the device (1) is arranged point-symmetrically, see FIG. 26.

In a further advantageous development, the sensor element (3) of the device (1) is arranged axial-symmetrically, see FIG. 17.

Figure 28:
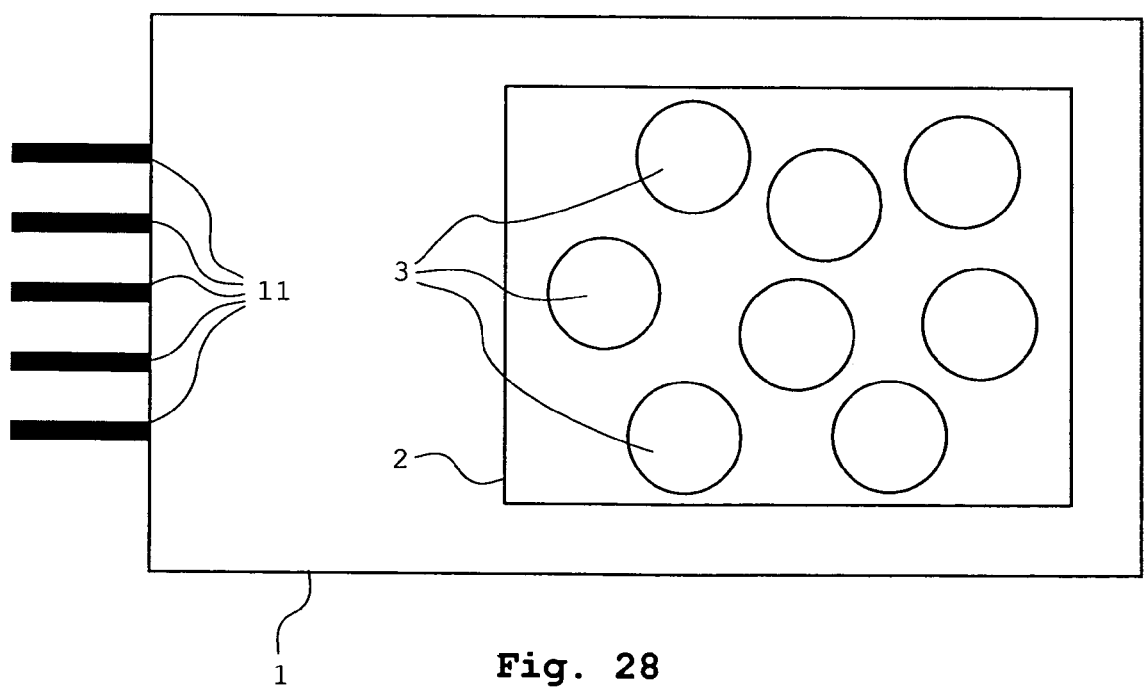
FIG. 28 is an elevation view of the device of the present invention with circular sensor elements in irregular arrangement.

In a further advantageous development, the sensor element (3) of the device (1) is arranged irregularly, see FIG. 28.

In another advantageous development, the first conductive layer (5), the second resistive layer (6) and the third conductive layer (9) are combined differently, as the case may be, between adjacent sensor elements (3). In order for the electronic selectability of the sensor element (3) to be obtained, the intersection of a layer group of the first conductive layer (5) and the layer group of the third conductive layer (9) must yield an individual sensor element (3). A layer group consists of all those first conductive layers (5) or, respectively, third conductive layers (9) of varying sensor elements (3) which are joined with one another in direct electrical conduction. Preferably, all first conductive layers (5) of sensor element (3) combine with one another in electrical conduction, while all third conductive layers (9) of the sensor elements (3) are electrically isolated from one another. The choice of the sensor element (3) to be measured results from this configuration by production of an electrically conducting connection between the data gathering electronics and the third conductive layer (9) of the corresponding sensor element (3). The direct joining of the second resistive layers (6) of the sensor element (3) against each other has other consequences. The second resistive layers (6) of the sensor element (3) are directly electrically connected, so a cross-coupling effect can occur. This has the consequence that with the alteration of an electric potential under the influence of an external force-effect to a sensor element (3) the electric potential to the adjacent also changes. With the selection of a sensor element (3) the force-effects upon the adjacent sensor element (3) have, in this case, an effect on the result.

In a further advantageous development, the device (1) is present in the form of a probe.

In a further advantageous development, the device (2) is present in the form of a tongs.

In a further advantageous development, the device (1) comes as a medical instrument in the form of a probe for use in surgery.

In a further advantageous development, the fourth electrically isolated layer (4) as well as the fifth electrically isolated layer (8) is mechanically rigid.

In a further advantageous development, the fourth electrically isolated layer (4) as well as the fifth electrically isolated layer (8) is mechanically flexible.

In a further advantageous development, the first conductive layer (5) of a sensor element (3) comprises at least one electrically conducting supply lead (12). Preferably, this electrically conductive supply lead guides through the volume of the fourth electrically isolated layer, see FIG. 9.

In a further advantageous development, the third conductive layer (9) of a sensor element (3) has at least one electrically conducting supply lead (10). Preferably, this electrically conducting supply lead (10) guides through the volume of the fifth electrically conducting isolated layer (8), see FIG. 2.

The following is a list of the numerals appearing in the drawings and the description of the components to which same refer:

(1) Device for the contacting measurement and local assignment of mechanical and local assignment of mechanical and geometric properties of objects.
(2) Sensor surface
(3) Sensor element
(4) Fourth electrically isolated layer
(5) First conductive layer
(6) Second resistive layer
(7) Opening
(8) Fifth electrically isolated layer
(9) Third conductive layer
(10) Electrical supply lead for the third conductive layer (9)
(11) Electrical supply lead
(12) Electrical supply lead for the first conductive layer (5)
(13) Sixth electrically isolated layer
(14) First geometric structure of the fourth electrically isolated layer (4)
(15) Second geometric structure of the fifth electrically isolated layer (8)

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims.

What is claimed is:

1. Device for a measurement by contact and a local classification of mechanical and geometric properties of an object comprising at least two sensor elements, each of said sensor elements having a first conductive layer, a second resistive layer and a third conductive layer, wherein the first and the third conductive layer exhibit a higher electrical conductivity than the second resistive layer, wherein also in an unloaded state of the device, a direct electrically conductive mechanical connection exists between the first conductive layer and the second resistive layer as well as between the second resistive layer and the third conductive layer, wherein when an electric potential difference between the first conductive layer and the third conductive layer is applied, electric current is flowing from the first conductive layer through the second resistive layer to the third conductive layer, wherein when an external force acts onto the device, the size of the contact surface between the first conductive layer and the second resistive layer and/or between the second resistive layer and the third conductive layer is changed thereby changing the size of a pathway for electric current, and wherein the magnitude of the external force is determined according to the magnitude of electric current flowing through the second resistive layer characterized in that the first and the third conductive layers mechanically deform, in case a force acts vertical to the plane of the position of at least one of the layers.

2. Device for a measurement by contact and a local classification of mechanical and geometric properties of an object comprising at least two sensor elements, each of said sensor elements having a first conductive layer, a second resistive layer and a third conductive layer, wherein the first and the third conductive layer exhibit a higher electrical conductivity than the second resistive layer, wherein also in an unloaded state of the device, a direct electrically conductive mechanical connection exists between the first conductive layer and the second resistive layer as well as between the second resistive layer and the third conductive layer, wherein when an electric potential difference between the first conductive layer and the third conductive layer is applied, electric current is flowing from the first conductive layer through the second resistive layer to the third conductive layer, wherein when an external force acts onto the device, the size of the contact surface between the first conductive layer and the second resistive layer and/or between the second resistive layer and the third conductive layer is changed thereby changing the size of a pathway for electric current, and wherein the magnitude of the external force is determined according to the magnitude of electric current flowing through the second resistive layer characterized in that the first conductive layer, the second resistive layer and the third conductive layer mechanically deform, in case a force acts vertical to the plane of the position of at least one of the layers.

3. The device according to claims 1 or 2, characterized in that at least one of the layers has a different geometric form, such that either between the first conductive layer and the second resistive layer or the second resistive layer and the third conductive layer or also between the first conductive layer and the second resistive layer as well as between the second resistive layer and the third conductive layer a space is present.

4. The device according to claims 1 or 2, characterized in that in case a force acts vertical to the plane of the position of at least one of the layers, the size of a contact surface between the first conductive layer and the second resistive layer or between the second resistive layer and the third conductive layer or also between the first conductive layer and the second resistive layer as well as between the second resistive layer and third conductive layer changes.

5. The device according to claims 1 or 2, further comprising a fourth electrically isolated layer being in mechanical contact with the first conductive layer.

6. The device according to claim 5, characterized in that the fourth electrically isolated layer has a first geometric structure.

7. The device according to claim 6, characterized in that the first geometric structure exhibits a direct mechanical contact with the second resistive layer.

8. The device according to claims 1 or 2, further comprising a fifth electrically isolated layer being in mechanical contact with the third conductive layer.

9. The device according to claim 8 characterized in that the fifth electrically isolated layer has a geometric structure.

10. The device according to claim 9, characterized in that the second geometric structure has a direct mechanical contact with the first conductive layer.

11. The device according to claim 9, characterized in that the second geometric structure is in direct mechanical contact with the second resistive layer.

12. The device according to claims 1 or 2, characterized in that the first conductive layer deforms in case a force acts vertical to the plane of the position of at least one of the layers.

13. The device according to claims 1 or 2, characterized in that the second resistive layer mechanically deforms, in case a force acts vertical to the plane of the position of at least one of the layers.

14. The device according to claims 1 or 2, characterized in that the first conductive layer and the second resistive layer mechanically deforms, in case a force acts vertical to the plane of the position of at least one of the layers.

15. The device according to claims 1 or 2, characterized in that the first conductive layer as well as the second resistive layer exhibit no curvature and the third conductive layer exhibits at least one curvature.

16. The device according to claims 1 or 2, thereby characterized, in that the first conductive layer as well as the third conductive layer have no curvature and the second resistive layer has at least one curvature.

17. The device according to claims 1 or 2, characterized in that the first conductive layer has no curvature and at least the second resistive layer as well as the third conductive layer in each case exhibits curvature.

18. The device according to claims 1 or 2, characterized in that the first conductive layer at least has a curvature and the second resistive layer as well as the third conductive layer have no curvature.

19. The device according to claims 1 or 2, characterized in that the first conductive layer as well as the third conductive layer in each case have curvature and the second resistive layer has no curvature.

20. The device according to claims 1 or 2, characterized in that the first conductive layer and also the second resistive layer at least in any case exhibit curvature, and the third conductive layer has no curvature.

21. The device according to claims 1 or 2, characterized in that the at least two sensor elements have different sizes.

22. The device according to claims 1 or 2, characterized in that the at least two sensor elements have different geometric forms.

23. The device according to claims 1 or 2, characterized, in that the at least two sensor elements have an eight-cornered form.

24. The device according to claims 1 or 2, characterized in that there is no direct electrically conductive connection between the third conductive layer of the one sensor element and the third conductive layer of the at least one other sensor element.

25. The device according to claims 1 or 2, characterized in that there is a direct electrically conductive connection between the first layer of the one sensor element and the first conductive layer of the at least one other sensor element.

26. The device according to claims 1 or 2, characterized in that there is no direct electrically conductive connection between the second resistive layer of the one sensor element and the second resistive layer of the at least one other sensor element.

27. The device according to claims 1 or 2, characterized in that the first conductive layer comprises an electrically conducting supply lead.

28. The device according to claims 1 or 2, characterized in that the third conductive layer comprises an electrically conducting supply lead.

29. The device according to claims 1 or 2, wherein the first conductive layer and the third conductive layer have no direct mechanical connection with one another.

30. The device according to claims 1 or 2, wherein the third conductive layer has a convex curvature such that a space is formed between the third conductive layer and the second resistive layer.

31. The device according to claims 1 or 2, characterized in that there is a direct electrically conductive connection the third conductive layer of the one sensor element and the third conductive layer of the at least one other sensor element.

32. The device according to claims 1 or 2, characterized in that the second resistive layer exhibits an electrical conductivity.

* * * * *